United States Patent
Deen et al.

(10) Patent No.: US 10,158,681 B2
(45) Date of Patent: Dec. 18, 2018

(54) METHOD OF, A SYSTEM AND DEVICE FOR INITIALIZING A COMMUNICATION SESSION IN A COMMUNICATIONS NETWORK

(75) Inventors: Lucien Deen, Oisterwijk (NL); Sergio Bruno Lavrador de Abreu, Tilburg (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 624 days.

(21) Appl. No.: 14/388,984

(22) PCT Filed: Mar. 30, 2012

(86) PCT No.: PCT/EP2012/055820
§ 371 (c)(1),
(2), (4) Date: Oct. 22, 2014

(87) PCT Pub. No.: WO2013/143605
PCT Pub. Date: Oct. 3, 2013

(65) Prior Publication Data
US 2015/0074273 A1    Mar. 12, 2015

(51) Int. Cl.
*G06F 15/173* (2006.01)
*H04L 29/06* (2006.01)
(Continued)

(52) U.S. Cl.
CPC .......... *H04L 65/1076* (2013.01); *H04L 47/70* (2013.01); *H04M 7/128* (2013.01); *H04L 63/0428* (2013.01); *H04M 3/4931* (2013.01); *H04M 2203/6009* (2013.01); *H04W 4/005* (2013.01); *H04W 4/70* (2018.02);
(Continued)

(58) Field of Classification Search
CPC ... H04L 12/911; H04L 29/06; H04L 65/1076; H04L 63/0428; H04L 47/70; H04W 4/005; H04W 12/02; H04W 76/022; H04M 7/128; H04M 2203/6009; H04M 3/4931
See application file for complete search history.

(56) References Cited

U.S. PATENT DOCUMENTS 6,161,008 A     12/2000 Lee et al.
2005/0282565 A1*  12/2005 Shaheen ............. H04L 12/5895
                                                  455/466

(Continued)

*Primary Examiner* — Benjamin M Thieu
(74) *Attorney, Agent, or Firm* — Murphy, Bilak & Homiller, PLLC (57) ABSTRACT

A party (2) in a telecommunications network (1) comprises access information (3) pertaining to communication capabilities the party (2) is able to handle. The party (2) is registered (4) with a unique identity (6) and at least one network contact address (7) at a server (5). Access information required for setting up a communication session with the party (2) is retrieved by initiating, by an entity (8) in the network (1), of a contact request (9) to the server (5) for at least one network contact address (7) of the party (2) from which access information of the party (2) is available. The server (5) forwards the at least one network contact address (6) of the party (2) in a token (10). Using the received at least one network contact address (6), the entity (8) initiates an access request (11) to the party (2) for retrieving access information (3) and receives access information (12) from the party (2) in response to the access request (11).

14 Claims, 7 Drawing Sheets

(51) Int. Cl.
    *H04M 7/12*         (2006.01)
    *H04L 12/911*      (2013.01)
    *H04W 4/70*        (2018.01)
    *H04W 76/12*      (2018.01)
    *H04M 3/493*      (2006.01)
    *H04W 4/00*        (2018.01)
    *H04W 76/02*      (2009.01)
    *H04W 12/02*      (2009.01)

(52) U.S. Cl.
    CPC .......... *H04W 12/02* (2013.01); *H04W 76/022* (2013.01); *H04W 76/12* (2018.02)

(56) References Cited

U.S. PATENT DOCUMENTS

| | | | | |
|---|---|---|---|---|
| 2006/0262736 | A1* | 11/2006 | Dong | H04L 43/12 370/254 |
| 2009/0138717 | A1* | 5/2009 | Calamera | H04L 9/3234 713/172 |
| 2011/0213843 | A1* | 9/2011 | Ferrazzini | H04L 63/102 709/206 |
| 2011/0256864 | A1* | 10/2011 | Fitzgerald | H04L 63/30 455/426.1 |
| 2013/0054965 | A1* | 2/2013 | Catrein | G06F 21/10 713/167 |
| 2013/0073725 | A1* | 3/2013 | Bordeleau | H04L 67/34 709/224 |
| 2013/0297744 | A1* | 11/2013 | Foti | H04L 63/0281 709/219 |

\* cited by examiner

METHOD OF, A SYSTEM AND DEVICE FOR INITIALIZING A COMMUNICATION SESSION IN A COMMUNICATIONS NETWORK

TECHNICAL FIELD

The present invention generally relates to telecommunications and, more specifically, to the retrieval of access information of parties subscribed in a telecommunications network.

BACKGROUND

The growth of communication devices has never been as immense as the last couple of years. It is expected that within the upcoming years the total number of communication devices rise exponentially. These devices may operate in a variety of different telecommunication networks, and may support a multitude of applications and protocols. A party may, for example, own a Smartphone, a tablet PC, a notebook, etc. which enable that party to connect to these different types of networks. Additionally devices arranged to communicate to other devices without human intervention, typically denoted as Machine to Machine (M2M) communication, should also be enabled to connect to these different types of networks.

In particular, the upcoming markets for M2M devices, smartphones as well as tablet PC's contribute to the growth of telecommunication networks. These types of mobile communication devices enable parties to connect to different networks using one single device. A Smartphone, for example, may access various social media Internet sites, support SMS-messaging, voice services, data transfer, or GPS based applications and the like.

The different communication applications or services and telecommunications systems each have dedicated policies, protocols, rules and techniques for supporting communication between their subscribed parties. Accessing such different communication applications and telecommunications networks implies that a single communication device needs to apply such different kinds of protocols and rules.

Known systems like Voice over Internet Protocol, VoIP, gameserver providers, etc. keep a central registry where a subscriber of that particular system or network is registered. Such a registry is generally implemented in a central database, which contains subscriber profile data comprising, for example, personal information or preferences of a particular subscriber. The database is used by subscribers of the network to search for and select other subscribers in the same network for contacting.

Whenever a communication application, executed at a first device or user equipment of a communication network, intends to reach another communication application executed at a second device within the same network, contact details of that communication application can be retrieved from such central database. After receiving the requested contact details, the first device may apply the received contact details as to initialize a communication session to the second device using that particular communication application. However, if a specific communication application is not available at one of the devices, such a communication session can not be established.

New protocols and applications may require an update of existing or even the installation of new databases, which can also involve the implementation of authentication and/or authorization policies.

In such a connective environment, wherein different types of communication networks may be accessed by a variety of different communication devices with existing applications and new applications and services, one of the problems is to find out, in an efficient manner, how to contact another party in a communications network or system. In other words, a problem is how to retrieve communication details of another party, who is not necessarily a subscriber applying the same communication application within the same network, but can be a subscriber to another network or system, executing a different communication application, for example.

A further problem is to determine the required capabilities for successfully establishing a communication session between two parties, for example the type of protocol, authentication and/or authorization to be used for the communication session to be established.

SUMMARY

It is an object of the present invention to obviate at least some of the above disadvantages and provide an improved method, system and device for initializing a communication session in a communications network In a first aspect, there is provided a method of requesting access information of a party to communicate with in a telecommunications network, the party having access information comprising communication capabilities that the party is able to handle, and wherein the party is registered with a unique identity and at least one network contact address at a server comprised by the network. In the description below, this server is also denoted by the term Address Registration Server, ARS.

The method comprises the steps of initiating, by an entity in the network, a contact request to the Address Registration Server for at least one network contact address of the party, the contact request comprising information representing the identity of the party and receiving, by the entity, a token from the Address Registration Server, the token comprising the at least one network contact address of the party. The method further comprises the steps of initiating, by the entity, an access request to the party for retrieving the access information using the at least one network contact address of the party as comprised by the token, and receiving, by the entity, access information from the party in response to the access request.

The access information stored at the party may comprise, for example, generic information like the types of protocols that are supported, version of the protocols, the name of applications, download information of an application, timing parameters, and other data which may aid in determining a type of communication session to be set up, such as a voice, audio, game, video, or data session, for example. Also data which is for e.g. privacy reasons to be kept under control of the party is to be understood as comprised by the access information.

This access information may be stored at the party or at one or several user devices or user equipment to which the party has access to. In response to the access request the party may submit the access information to the entity. The party may submit locally stored access information or retrieves access information from a device where the party has access to and subsequently submit the retrieved access information to the entity.

Preferably, the access information is stored at user equipment that is permanently available from a telecommunications network.

The method is based on the insight that by providing an Address Registration Server in which parties in a communication network are registered with a unique identity and at least one network contact address, and by storing the access information at the party and which party is accessible using the at least one network contact address, there is no longer a need for a central database or a number of central databases supporting access information of the applicable different types of communication sessions, applications, protocols, rules, services and data, available to the party.

It will be appreciated that the Address Registration Server can be agnostic of, i.e. has no knowledge of, any information of an application, protocol or data to establish a communication to the party, other than e.g. an appropriate network contact address to set up a link to the party for retrieving access information, as these aspects and information are now handled by the parties subscribed or registered in the network.

The Address Registration Server acts as a server which provides a network contact address of a party in a particular network. It is the party that provides the specific access information on how that party is to be contacted, applying a particular type of protocol or different protocols, for example. There is no need for the Address Registration Server to support numerous types of protocols used in the specific applications, services or data. The architecture of the Address Registration Server may be restricted to comprise a list of parties and information on how to contact these parties.

Several advantages exist in maintaining the access information locally on the party's user equipment instead of being stored in a central network database or a central server. One of the advantages is that in such case the Address Registration Server does not need to apply intensive logic and processing, such that the Address Registration Server may operate at high speed without requiring to be designed as a relatively 'heavy' process server, for example.

According to the present invention, the Address Registration Server is not required to perform functions or operations like handling or initiating communication sessions between parties, etc. This limits the total load for the Address Registration Server, as these types of functions are performed by the parties itself and/or the network entity.

Another advantage of the invention is that amending access information, such as adding new types of supported communication sessions, is made less cumbersome as this does not depend on the implementation of the Address Registration Server. A party may alter, or modify, its own access information according to its own user interface, if applicable, as this alteration remains limited to the device or user environment of the party. In this way, new types of supported communication sessions may be implemented without having to communicate with a central server or being dependent from resources provided by an operator. Data, additional to, or replacing existing data comprised by the access information under control of the party, is maintained at the party's device or devices accessible by the party.

The invention enables more flexibility for altering the access information, as the party may alter the access information itself and, for example store the altered access information in a storage devices under control of the party.

The access information may contain information comprising, for example, personal information data, preference settings, application data, etc. of a party, of a particular user or of an application or service controlled by the party.

Because such access information of a party may alter dynamically, for example in a single hour, day, week, etc., it is regarded most efficient to store the access information at a local device under control of the party, thereby further reducing network load for these alterations to be communicated.

As the access information of a particular party is stored at the device accessible by the party, authorization and security for accessing this information is also governed by the party. This again reduces the load on the Address Registration Server. Stealing, phishing, or snooping of information from the Address Registration Server results in relatively useless information, for example only a certain network contact address of a party.

In an example, the method further comprises the step of initiating, by the entity, a communication session towards a party being a called party, based on the access information received from this party.

That is, based on the access information, the entity may initiate the set up of a particular type of communication session, for example a Voice over Internet Protocol, VoIP, telecom-voice session, with, for example an encryption protocol to be applied or a negotiation of a codec to be applied.

If, the access information of a party indicates a preferred type of a communication session and the entity, requesting the access information is also capable of supporting that particular type of communication session, the network may process that particular communication session between the two parties automatically, i.e. without requesting a user for input.

In another example, before setting up the communication session, the entity can wait for input of an application or the user of the entity before initiating a communication session of a particular type. If, for example, the access information received comprises support for several types of communication sessions without a clear indication which of these types is preferred, and if the entity is also capable to support some of these types, input from the application or user of the entity may be requested about which type of communication session to establish. Only after indicating, by the calling party, of a preferred type, the entity initiates establishment of that type of communication session between the entity and the party of which the access information is received.

In another example, the step of receiving access information comprises receiving the access information depending on user input of the party to be contacted from which access information is requested.

Optionally, the capability details of the party received in the access information can be represented as a mere icon profile or label on a display of the entity, hiding the accounts details. More or full details can be provided on request, for example.

The entity may be any of a Personal Computer, PC, a tablet PC, a network server, a network node, a network gateway, a Mobile Phone/Smartphone, an M2M device, and the like, whether or not solely arranged for performing the method according to the invention.

In another example, the entity is initializing the communication session, and is regarded a calling party. It is the calling party which is arranged to communicate with the Address Registration Server for requesting at least one network contact address of the party to be called and it is the calling party that is arranged for initiating an access request for retrieving access information from the network contact address of the party to be called comprised in the received token.

The party, device or entity may be mobile or may be fixed, for example a mobile communication device or a fixed telephone device.

In another example, the token comprises at least one of a network contact address of the calling party taken from the contact request, a level of authentication and a timestamp of the contact request.

With the access request, the entity may also provide an identity and/or network contact address of a calling party and/or the entity itself. A party to be called receiving such access request may, for example, decide to provide different access information based on or specified to the identity of the calling party, or entity, requesting access information. In one example, the party may decide to provide its Voice over Internet Protocol access details if the party would like to instantaneously communicate with a calling party.

The party receiving an access request likewise may decide to provide certain parts of access information. It may occur from preferences or security settings, that calling parties having unknown identities are not allowed to receive the entire access information from a party to be called, but only parts thereof. If the party does not prefer to communicate instantaneously, the party may decide to provide access information in the form of an e-mail address only, for example.

As also mentioned above, in another example, the access information comprises a preference setting for indicating a preferred type of a communication session for a party. Based on this setting, a calling party, or the entity, may establish a certain type of communication session directly.

In yet another example, the access request comprises information of communication capabilities of a calling party, and wherein the step of receiving the access information from a party to be called comprises receiving access information of communication capabilities mutually available to the calling party and the party to be called. It will be appreciated that access information that can not be supported by a calling party is superfluous to receive by that calling party.

The party to be called may own several communication devices, for example, a Personal Computer, PC, a tablet PC, a network server, a network node, a network gateway, a Mobile Phone/Smartphone, an M2M device, etc. The access information provided by such party may contain information on how to establish a communication session with all of these devices individually. In some scenarios it is preferred to establish a communication session with, for example, a mobile phone when requesting a telephone session. In other scenarios, for example when requesting a multiplayer game, it is desired to establish a communication session with a personal computer or a tablet PC.

Although the access information may be stored locally on user equipment of the party to be called, this does not exclude that the access information may be different for different users commonly using that particular party's user equipment or communication device. Access information may be different for any person using such communication device. In other words, the access information may be device or party dependent as well as user dependent. In such case the device may register itself with multiple identities to the Address Registration Server.

In yet another example, a party comprises a list of trusted parties and the access information received from this party depends on whether a calling party is a trusted party according to this list of trusted parties.

It may be desirable to provide a list of parties, i.e. calling parties, which, beforehand, may have access to the access information. All other parties will, for example, be denied to avail themselves of access information or may just receive a selected part thereof. In this case, access information containing no or limited communication capabilities may be provided. Unknown parties may not be provided with any information on how to establish a communication session with a called party.

In another example of the present invention, the unique identity is any of an MSISDN (Mobile Subscriber Integrated Services Digital Network Number) of a party, a next available MSISDN of a party or a non-MSISDN based identification of a party such as a Media Access Control, MAC, address.

For security reasons, several levels of authentication are feasible. Identities may be registered at the Address Registration Server by verifying these identities with trusted organizations like VeriSign, or governments, or by direct subscription using an ID like a passport, or by e.g. Telecommunication operators or providers.

For security reasons, the token and/or the access information is, in another example, encrypted.

In another example of the present invention, there is provided an entity arranged for operation in a telecommunications network for requesting access information of the party in a telecommunications network. The party having access information comprising the communication capabilities that the party is able to handle, and wherein the party is registered with a unique identity and at least one network contact address at the Address Registration Server. The network entity comprises a contact request unit arranged for initiating a contact request to the Address Registration Server for at least one network contact address of a party, the contact request comprising information representing the identity of the party; a receiving unit arranged for receiving a token from the Address Registration Server, the token comprises at least one network contact address of the party; an access request unit arranged for initiating an access request to the party for retrieving the access information using the at least one network contact address of the party comprised by the token, and a further receiving unit arranged for receiving access information from the party in response to the access request.

In an example, the calling party may be arranged for establishing a communication session between the calling party and a party to be called, based on the access information received from the party to be called.

In yet another example of the present invention there is provided a telecommunications network comprising an entity arranged for requesting access information of a party in the telecommunications network, the party having access information comprising communication capabilities the party is able to handle. The telecommunications network further comprising an Address Registration Server in which the party is registered with a unique identity and at least one network contact address. The network entity comprising a contact request unit arranged for initiating a contact request to the Address Registration Server for at least one network contact address of the party, the contact request comprising information representing the identity of the party, a receiving unit arranged for receiving a token from the Address Registration Server, the token comprising the at least one network contact address of the party, an access request unit arranged for initiating an access request to the party for retrieving the access information using the at least one network contact address of the party comprised by the token, and a receiving unit arranged for receiving access information from the party in response to the access request. The Address Registration Server comprises a register arranged for storing an identity and at least one network contact address of the party, a receiving unit arranged for receiving the contact request from the entity, a token generating unit arranged for generating the token comprising the at least one network contact address in response to the contact request, and a forwarding unit arranged for forwarding the token to the entity.

As previously mentioned, the access information may include information concerning protocols, services, timing parameters, trusted parties, preference settings, etc. of the different types of communication sessions. The access information may also contain other generic information like version of the protocols, type and name of applications, and download-place of the applications and personal data, related to a subscription with a network provider or operator. Other information like whether the application is related to audio, game, video, etc., may also be comprised in the access information. The skilled person may appreciate other information to be encompassed by the access information.

For example, if a party would like to play a game over the network, a calling party may request access information of one of its friends, i.e. a party to be called for playing the game. After receiving the access information from the respective party, the calling party may decide to play a chess game with that other party. Therefore, the calling party may first downloads the chess game from a download-place of the game comprised in the access information of the party to be called, and initiates a game connection, i.e. a particular type of communication session suitable for playing the chess game, towards the other party, based on the protocol of the chess game.

The at least one network contact address will be, for example, in most cases an Internet Protocol address, but can be any type of address by which the party is subscribed to or available in or from a telecommunications network. Other non-limiting examples are a Universal Resource Location, URL, address, a Universal Resource Identifier, URI, address, a domain name address, a gateway address or a telephone number and the like. The unique identity is in most cases an easy to remember name on which a subscription can be searched.

For establishing a communication session between a calling party and a party to be called based on the access information provided by the party to be called, the skilled person will appreciate that a network may use already available network resources.

In yet another example, a party may comprise a plurality of communication devices or user equipment or services, and wherein each of the at least one network contact address of the party corresponds to a different one of the plurality of communication devices, equipment or services.

The invention also provides user equipment in the form of a communication device for operating as a party in a telecommunication network according to invention, wherein the user equipment is arranged for providing access information based on any of user input, a list of trusted parties, and communication capabilities mutually available at a calling party and a called party.

Those skilled in the art will appreciate that the phrase "the party to communicate with" or in short "the party", is to be construed as both a subscriber and an application executed at a device such as a telephone, a server, a Machine to Machine, M2M, device or a computer.

The above-mentioned and other features and advantages of the invention will be best understood from the following description referring to the attached drawings. In the drawings, like reference numerals denote identical parts or parts performing an identical or comparable function or operation.

DETAILED DESCRIPTION OF THE DRAWINGS

The invention may be applied in any telecommunications network or system such as a Public Switched Telephone Network, PSTN, an Integrated Services Digital Network, ISDN, a mobile telecommunications system, an Internet protocol Multimedia Subsystem, IMS, communications network and Internet Protocol, IP, communication systems such as a Voice over IP, VoIP, system, and combinations thereof, which networks and systems, including future communication networks and systems, are all construed to be included in the term telecommunications network or system as used in the present description and claims.

Figure 1:
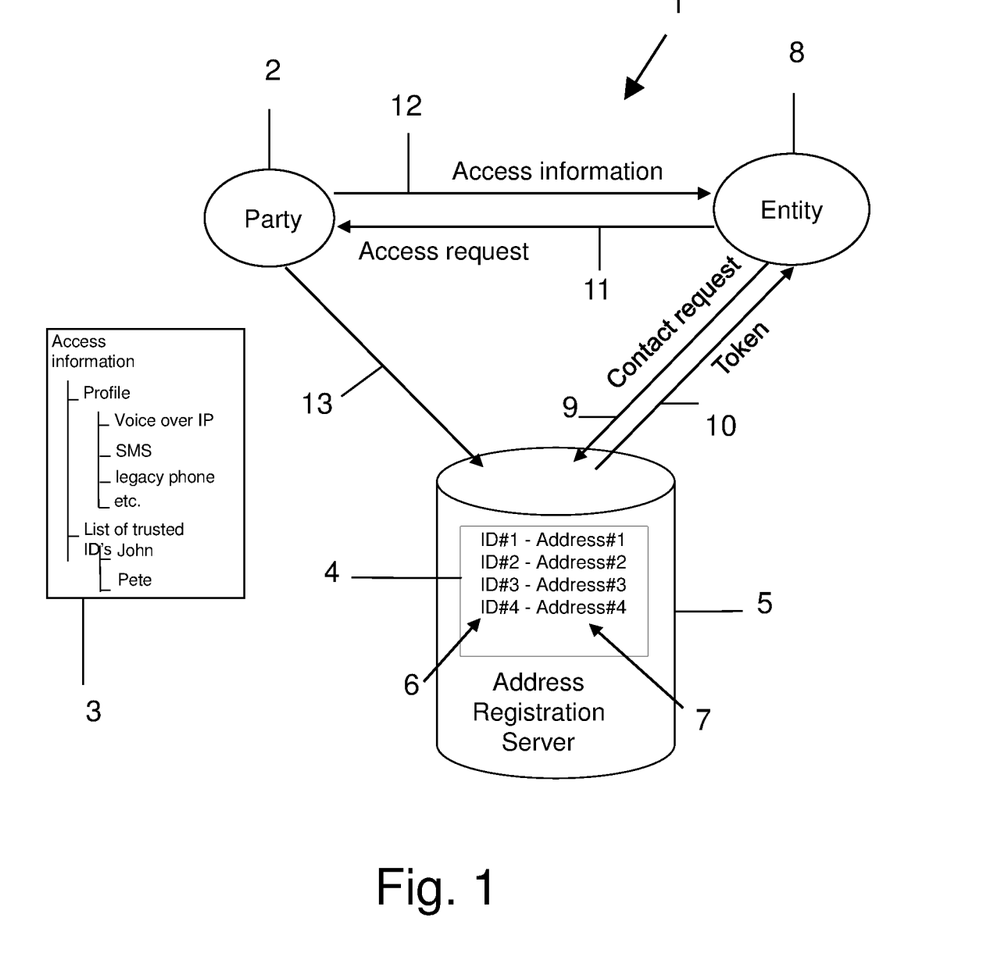
FIG. 1 is a schematic view of a telecommunications network for supporting a request for access information of a party by an entity in the telecommunications network, according to the invention.

FIG. 1 is a schematic view of a telecommunications network 1 arranged for processing a request 11 for access information 3 of a party 2 by an entity 8 in the network 1, in accordance with the present invention. The entity 8 represents any of a network server, a network node, a network gateway, and the like, or a calling party.

The entity 8 is arranged to initiate a contact request 9 towards an Address Registration Server, ARS, 5 for requesting at least one network contact address of the party 2. The ARS 5 stores 4 network contact addresses 7 associated with unique identities, IDs, 6 of parties to the telecommunications network 1. The ARS 5 may form part of the telecommunications network 1 and/or of an other telecommunications network operated by another operator, for example. The ARS 5 may also be a separate or dedicated server common to several telecommunications networks, for example. The ARS 5 may further be split up in several Address Registration Servers for reducing the load.

Party 2 registers its Address providing its identity. The identity may be verified by ARS. The contact request 9 comprises the unique identity 6 of the party 2. Also here the identity of entity 8 may be verified by ARS. Based on the received contact request 9, the ARS 5 generates a token 10 which comprises the at least one network contact address 7 of the party 2. In response to the contact request 9, the ARS 5 provides the entity 8 with a token 10 comprising, for example, an Internet network contact address of the party 2 at which the access information 3 is stored. However, the ARS 5 may provide the entity with several network contact addresses of the party 2, for example the Internet network contact address of a personal computer and the MSISDN (Mobile Subscriber Integrated Services Digital Network Number) of the party 2, a next available MSISDN of the party 2 or any other non-MSISDN based identification of the party 2. It is then up to the entity 8, which network contact address 7 to be used for retrieving the access information 3.

Based on the token 10, the entity 8 initiates an access request 11 to the party 2, requesting access information 3. As extensively elucidated in the summary section, the access information stored at the party 2 may comprise, among others, generic information like the types of protocols that are supported, version of the protocols, the name of applications, download information of an application, timing parameters, a list of trusted identities which are allowed to receive access information, and other data which may aid in determining a type of communication session to be set up, such as a voice, audio, game, video, or data session the party 2 is able to handle, for example.

Based on the received access request 11, for example an identity of a calling party comprised in the access request 11, the party 2 may decide to provide part of or to completely block access information 3 for the entity 8.

After receipt of access information 12, the entity 8 may initiate a communication session with the party 2, using the functionalities and support already available to the telecommunications system or network 1.

With the access request 11, for example, and/or after receipt of the access information 12, the entity 8 may additionally request input from a user before establishing a particular communication session, for example when the party 2 and/or a calling party have not indicated a particular preference for a type of communication session. However, the entity 8 by default, when no preferences are indicated, may initiate a voice telephone communication session.

In the case of an entity 8 being a calling party, capabilities details of the party 2 received with the access information 12 may be visually displayed at user equipment in the form of an icon or label, for example. By selecting a particular icon or label, the calling party may establish a respective communication session with the party 2.

As elucidated in the summary section, the access information 12 provided to the entity 8 may depend upon user input at the party 2. For example indicating a preference for a particular communication session by the party 2 being a called party. Such preference settings, however, may also be directly contained in the access information 3 stored at the network contact address of the party 2.

The access request 11 may also comprise information of communication capabilities available to a calling party or capabilities which the entity 8 may handle. The access information 12 provided by the party 2 may than be restricted or adapted to those capabilities available to both a calling party and the party 2 receiving the access request, for example.

Figure 2:
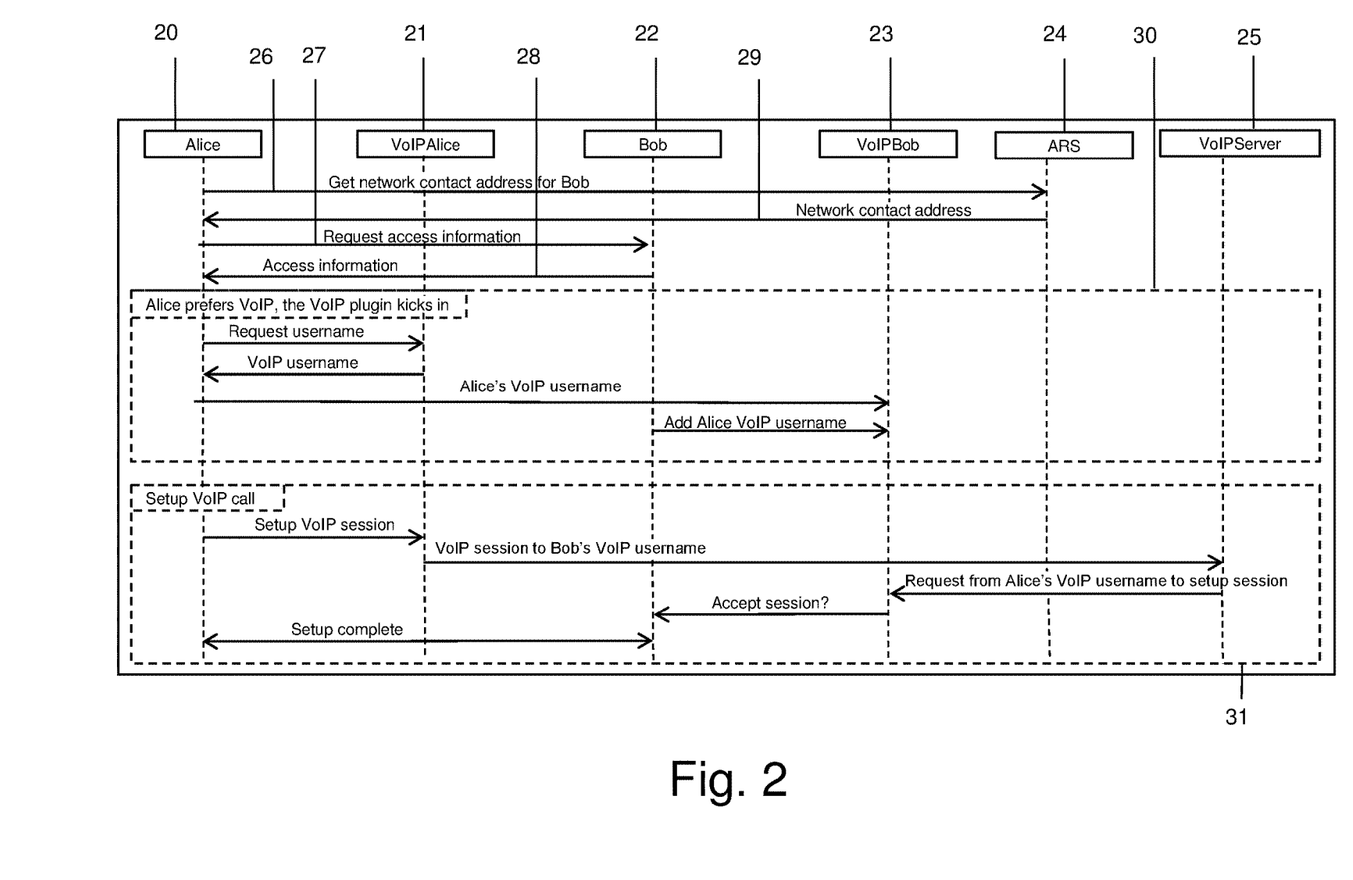
FIG. 2 is a schematic view of a method of establishing a communication session between a first or calling party and a second or called party, both having a Voice over Internet Protocol, VoIP, account, wherein access information is requested by the first party, according to an example of the invention.

FIG. 2 is a schematic view of information exchange steps in a method of establishing a communication session between a first or calling party 20, Alice, and a second party 22, Bob, to be called, both having a Voice over Internet Protocol, VoIP, account and wherein access information is requested according to an example the present invention. In FIG. 2 time is running from top to bottom of the Figure.

The first party 20 intends to establish a voice or audio session with the second party 22, however not knowing contact details of how to contact the second party or knowing what type of communication session the second party 22 is able to handle. The first party 20 is merely interested in establishing a type of communication session which is able to handle voice or audio calls. The only information available to the first party 20 is an identity of the second party 22, for example a nickname, or real name, like Bob, under which access information for setting up a communication session with the second party 22 can be retrieved.

In a first step, the first party 20 directly contacts an Address Registration Server, ARS, 24 by a contact request message 26 requesting at least one network contact address of the second party 22, i.e. "Get network contact address for Bob". In a token message 29, the first party 20 receives at least one network contact address from which access information of the second party 22 can be retrieved. The first party 20 may receive one or a plurality of network contact addresses, such as a network contact address of a personal computer, PC, a smart-phone, a tablet PC, or the like, in a computer or data network such as the Internet and may select, either automatically or manually by user input, one of these network contact addresses for retrieving access information of the second party 22.

After it is established, by the first party 20, which network contact address to be used for retrieving access information of the second party, the first party 20 directly forwards an access request message 27 to this network contact address, i.e. "Request access information". In this example, it is assumed that this network contact address corresponds to a Personal Computer, PC, running a VoIP application at the second party 22.

In response to this access request message 27, the PC at the second party 22 returns, in an access information message 28, that same is capable of handling VoIP sessions or calls 23, VoIPBob, as well as legacy telephone calls, for example. The access information received may include the VoIP username of the second party 22 and its legacy telephone number, for example. It is then up to the first party 20 which type of communication session to establish with the second party 22.

Assume that the first party 20 would like to initiate a VoIP communication session, but VoIP is not instantaneously available at the first party. To this end, a number of steps may have to be processed first by the first party 20 to install VoIP on a user equipment, as schematically illustrated in block 30 of FIG. 2. For example, first a VoIP plugin, VoIPAlice 21, needs to be loaded at the first party 20, i.e. "Alice prefers VoIP, the VoIP plugin kicks in". Once installed, the first party 20 has to avail itself of a username from VoIPAlice 21, i.e. "Request username". After receipt at the first party 20 of a username, i.e. "VoIP username", the first party 20 initiates forwarding of this username to the second party 22, i.e. "Alice's VoIP username", for example using a network contact address received from the ARS 24. The username of the first party 20 is added to the VoIPBob plugin 23 of the second party 22, i.e. "Add Alice VoIP username".

Once the VoIP usernames are available to the first and second party, a VoIP call or session can be set up, as illustrated by the steps in block 31 of FIG. 2. The first or calling party 20 initiates a VoIP session by selecting the VoIP username of the second or called party 22 in a "Setup VoIP call" command to its VoIP plugin VoIPAlice 21, for example. In turn, VoIPAlice 21 contacts a VoIP server 25 by forwarding the VoIP username of the second party 22, "VoIP session to Bob's VoIP username", for setting up a VoIP session with the second party 22. VoIPBob 23 receives this request from the VoIP server 25, "Request from Alice's VoIP username to setup session", and forwards a message for acceptance of a session request by the called party 22, i.e. "Accept session?". In the affirmative, the VoIP session or call between the first party 20 and the second party 22 is completed by the VoIP server 25, as indicated by the double arrow "Setup completed".

Figure 3:
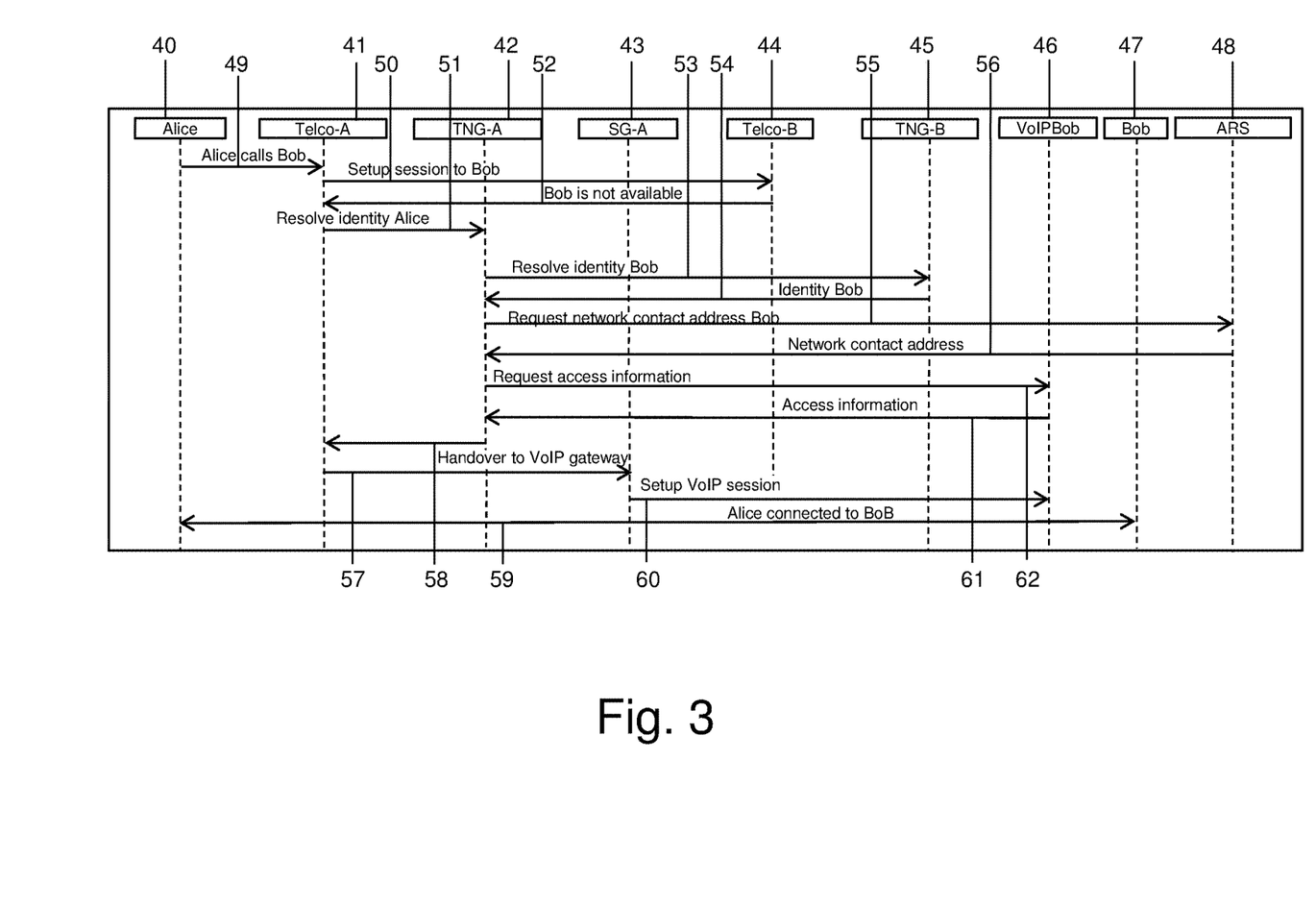
FIG. 3 is a schematic view of a method of establishing a communication session between a first or calling party having a legacy telephone and a second or called party having a Voice over Internet Protocol, VoIP, account, wherein access information is requested by a network entity operating in the telecommunications network to which the second party is subscribed or registered, according to an example of the invention.

FIG. 3 illustrates, in a schematic view, a method of establishing a communication session between a first or calling party 40, Alice, operating a legacy telephone, and a second or called party 47, Bob, wherein access information is requested by a network entity operating in the telecommunications network or system to which the first party 41 is subscribed or registered, according to an example the present invention. In FIG. 3 time is likewise running from top to bottom of the Figure.

Initially, the first party 40, using its legacy telephone, intends to establish a legacy phone communication session or call with a legacy phone of the second party 47. To this end, the first party 40 forwards a request 49, "Alice calls Bob", to a network node Telco-A 41 of its Telecommunications company A, for establishing a legacy phone communication session, providing the telephone number of the second party 47. In response to this request 49, node 41 of Telco-A initiates a setup message 50, "Setup session to Bob", to a node Telco-B44 of the Telecommunications company B, to which the second party 47 is registered. However, the second party 47 appears not available at the legacy telephone as requested, which is reported 52, "Bob is not available", from node 44 of Telco-B to node 41 of Telco-A.

The unavailability of the called party may results either in ending the request for establishing the communication session or in a connection to an automatic answering machine, for example. However, with the invention, instead of ending the communication session, an alternative manner for contacting the called party is provided.

To this end, node 41 of Telco-A, in response to the unavailability message 52, and based on the telephone number of the second party 47, initiates a request 51 to a network entity 42 being a Telecommunication Network Gateway 42, TNG-A, of Telco-A for resolving an identity of the second party 47 for requesting a network contact address from which access information is available comprising communication capabilities the second party 47 is able to handle. TNG-A 42 forwards 53 the request, "Resolve identity Bob", to a Telecommunication Network Gateway, TNG-B, 45 of Telco-B, for retrieving this identity of the second party 47. Based on the telephone number of the second party 47, received from TNG-A 42 in the request 53, TNG-B 45 provides the identity of the second party 47 to TNG-A 42 in a message 54, "Identity Bob".

After receiving the unique identity of the second party 47, the network entity TNG-A 42 initiates a contact request 55, "Request network contact address Bob", directed towards an Address Registration Server 48, ARS, for retrieving a network contact address at which access information can be requested or retrieved to contact the second party 47, other than by the telephone number originally available to the first party 40. The ARS 48, in a token message 56, "Network contact address", returns to TNG-A 42 at least one network contact address, stored with the unique identity of the second party in the registry of the ARS 48. The network contact address provided is, for example, the network contact address of a personal computer at which a VoIP account 46 of the called party 47 runs.

In an access request 62, "Request access information", directed to the personal computer of the second party, TNG-A 42 will then request access information to assess the voice or audio capabilities of the second party 47. After receiving access information from the second party 47, in a message 61, "Access information", in this case a VoIP profile of the second party 47, the TNG-A 42 forwards this VoIP profile to the node Telco-A 41, for setting up a VoIP communication session with the second party 47.

This VoIP communication session may be established in a manner as is known per se, i.e. handing over 57 of the communication session to a Voice over Internet Protocol gateway 43 of Telco A, VoIPG-A, "Handover to VoIP gateway", which set up a VoIP session using the relevant access information, and if necessary via an intermediate VoIP server (not shown), towards the VoIP account 46 of the second party 47. This, eventually results in establishing 59 of a voice communication session between the calling or first party 20, i.e. its legacy telephone, and the called or second party Bob 47, i.e. its VoIP account VoIPBob 46.

In those cases in which the first or calling party 40 initially does not know the telephone number of the second party 47, but only its unique identity, the Address Registration Server 48 has to be contacted first for retrieving access information of the second party 47 to be called.

Figure 4:
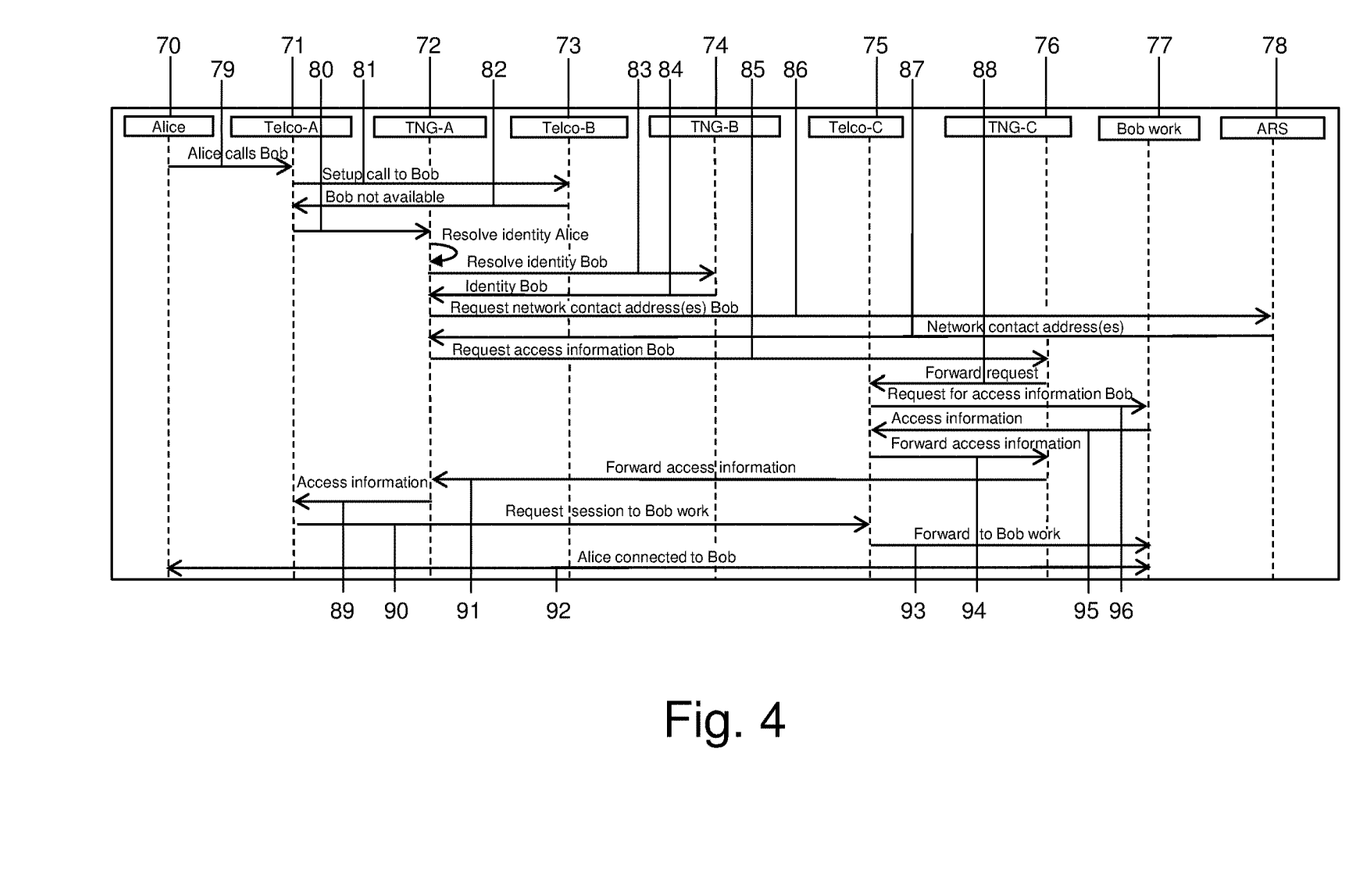
FIG. 4 is a schematic view of a method of establishing a legacy telephone communication session between a first or calling party and a second or called party, wherein access information is requested by a network entity operating in a telecommunications network to which the second party is subscribed or registered, according to an example of the invention.

FIG. 4 shows, in a schematic view, an example of the method according to the invention, used in requesting access information for establishing a communication session between a calling party 70, Alice, and a called party 77, Bob work, both operating a legacy telephone. In FIG. 4 time is likewise running from top to bottom of the Figure.

The first party 70, using its legacy telephone, intends to establish a legacy phone communication session or call with the legacy phone of the second party, Bob. The first party 70 forwards a request 79, "Alice calls Bob", to a network node Telco-A 71 of its Telecommunications company A, for establishing the legacy phone communication session by providing the telephone number of the second party. In response to this request 79, node 71 of Telco-A initiates a setup message 81, "Setup session to Bob", to a node Telco-B73 of the Telecommunications company B, to which the second party is registered. However, like the example in FIG. 3, the second party appears not available at its legacy telephone in telecommunications network B, which is reported 82, "Bob is not available", from node 73 of Telco-Bto node 71 of Telco-A.

In response to the unavailability message 82, node 71 of Telco-A forwards a request 80 to a Telecommunications Network Gateway 27 of Telco-A, TNG-A, for resolving an identity of the calling party 70. Further, as disclosed above in connection with the example of FIG. 3, TNG-A 72 forwards a request 83, "Resolve identity Bob", to a Telecommunications Network Gateway 74 of Telco-B, TNG-B, for retrieving a unique identity of the second party. Based on the telephone number of the second party received from TNG-A 72 in the request 83, TNG-B 74 provides the unique identity of the second party to TNG-A 72 in a message 84, "Identity Bob".

In response to receiving the unique identity of the second party, the network entity TNG-A 72 initiates a contact request 86, "Request network contact address(es) Bob", directed towards an Address Registration Server 78, ARS, for retrieving one or more network contact addresses at which access information can be requested or retrieved to contact the second party, other than by the telephone number originally available to the first party 40. The ARS 78, in a token message 87, "Network contact address(es)", returns to TNG-A 72 at least one network contact address, stored with the unique identity of the second party in the registry of the ARS 78. The network contact address provided is, for example, the network contact address of legacy telephone 77 operated by a Telecommunications company C, Telco-C, at an office at which the second party Bob is currently at work.

To request access information from the network contact address corresponding to the user equipment operated at Bob work 77, TNG-A 72 forwards an access request 85, "Request access information Bob", towards a Telecommunications Network Gateway 76 of telecommunications company C, i.e. TNG-C. The access request 85 comprises the identity of the first or calling party 70 as resolved by TNG-A with the request 80. TNG-C 76 forwards 88 the access request to a node 75 of Telco-B, from which the access request is eventually forwarded 96, "Request for access information Bob", to the network contact address corresponding to Bob work 77.

In response to the access request message 96, Bob work 77 provides access information 95 to the node Telco-C 75. The content of the access information provided by Bob work 77 may be a selection of the access information available at Bob work in view of the identity of the calling party 70, and may be restricted to access information pertaining to legacy telephone sessions, because the first or calling party 70 has no other means of communication than a legacy telephone, for example.

Node Telco-C 75 forwards 94 the received access information, "Forward access information", to the gateway TNG-C 76, from which the access information is forwarded 91, "Forward access information", to gateway TNG-A 72 of telecommunications network A to which the calling or first party 70 is subscribed or registered. TNG-A 72, eventually, forwards 89 the received access information to the entity or node Telco-A 71. Based on the access information received, in a manner known to the skilled person, node Telco-A 71 sets up a legacy telephone session between the first party 70 and the second party available at Bob work 77, by contacting 90 the node Telco-C, "Request session to Bob work", of the telecommunications network C in which Bob work 77 operates. This session request 93 is forwarded 93, "Forward to Bob work", by node Telco-C 75 to Bob work 77, eventually resulting in a legacy telephone call or session 92, "Alice connected to Bob", between the first party 70 and the second party Bob work 77.

Figure 5:
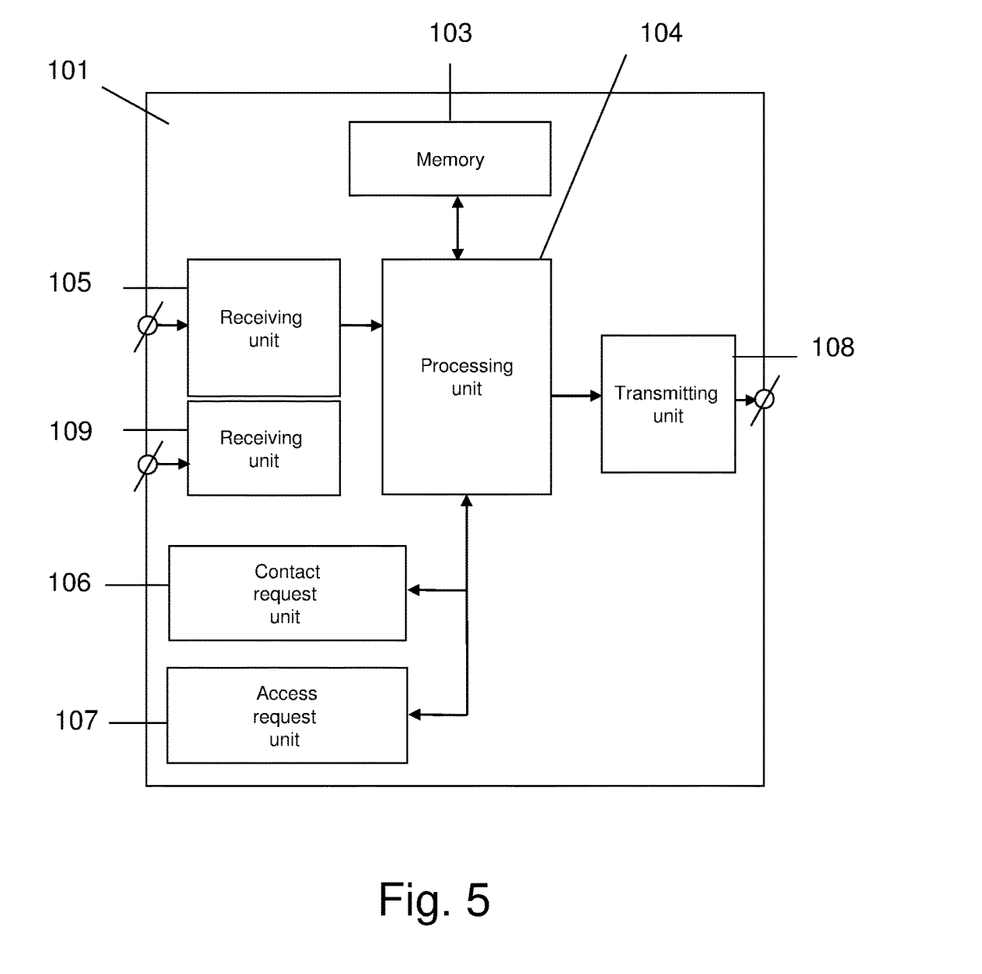
FIG. 5 is a schematic view of an example of a network entity for operation in a communications network according to the invention.

FIG. 5 depicts a network entity 101 for use in a telecommunications network in accordance with an example of the invention. The network entity 101 comprises a transmitting unit 108 arranged for transmitting a contact request to an Address Registration Server for requesting or retrieving at least one network contact address of a party to be called in a telecommunications network, for example. The contact request is initiated by a contact request unit 106 of the entity 101.

A receiving unit 105 of the network entity 101 is arranged for receiving at least one network contact address of a party in a token transmitted by an Address Registration Server. An access request unit 107 of the entity 101 is arranged for initiating an access request to a party or retrieving access information pertaining to that party, using the at least one network contact address comprised by the token received by the receiving unit 105. Receiving unit 109 of the network entity 101 is arranged for receiving access information from the party in response to the access request.

The entity 101 further comprises a memory 108, for storing data to be transmitted and/or received, while the units 105-109 operate under control of a processing unit 104. Those skilled in the art will appreciate that the receiving units 105 and 109 may be formed as a single receiving unit, for example.

The entity 101 can be any of a node in a telecommunications network, a telecommunications network gateway, a server, or the like, either stand alone or formed as part of an other network device.

Figure 6:
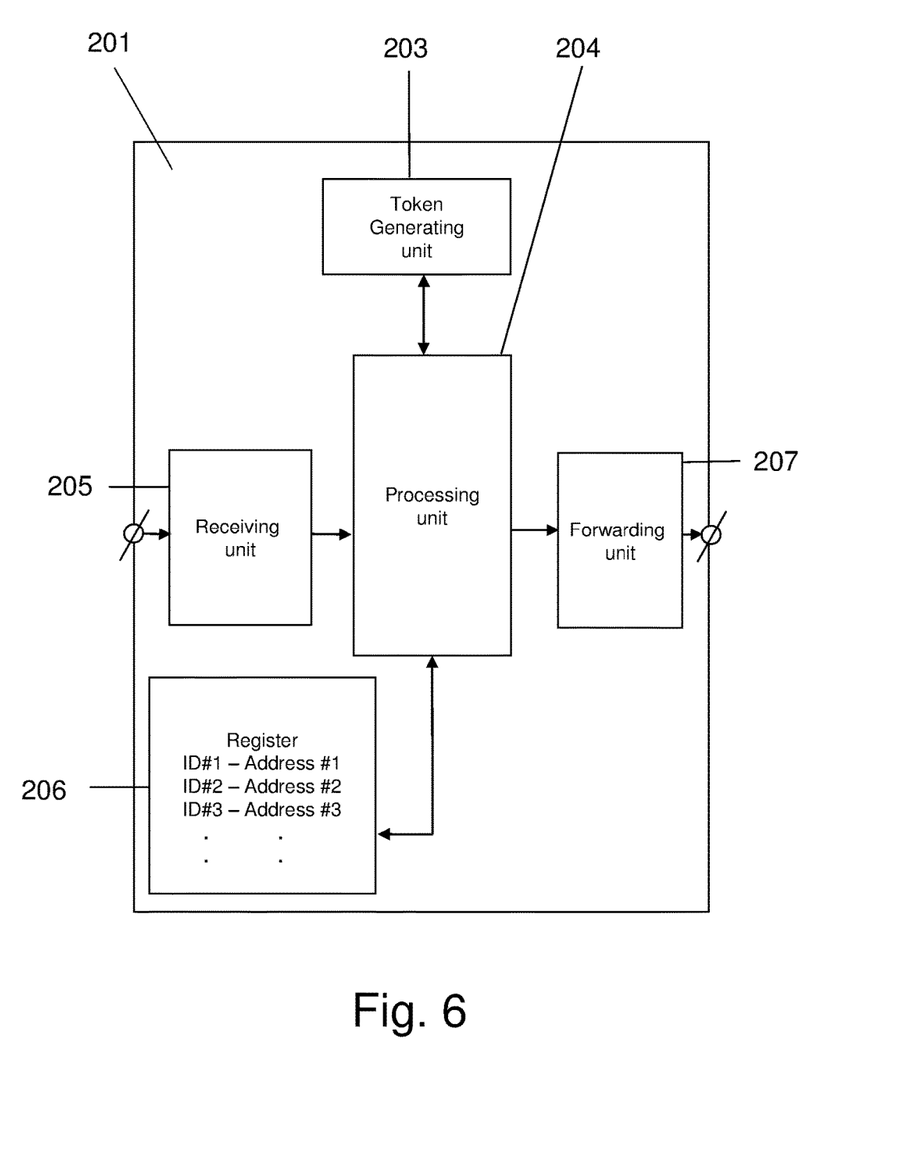
FIG. 6 is a schematic view of an example of an Address Registration Server for operation in a telecommunications network according to the invention.

FIG. 6 is a schematic view of an example of an Address Registration Server, ARS, 201 for operation in a telecommunications network according to the present invention. The ARS 201 comprises a register 206 arranged for storing network contact addresses, i.e. Address #1, Address #2, . . . , associated with unique identities, ID#1, ID#2, . . . , of parties having telecommunication capabilities. A receiving unit 205 of the ARS 201 is arranged for receiving contact request from an entity in a telecommunications network.

The ARS 201 further comprises a token generating unit 203 arranged for generating a token comprising at least one network contact address of a party in response to a contact request including a unique identity of a party, received by the receiving unit 205. A forwarding unit 207 of the ARS 201 is arranged for forwarding the generated token to the requesting entity. The operation of the ARS 201 is controlled by a processing unit 204.

For storing, amending or updating the data in the register 206 telecommunication operators and/or parties in a telecommunications system may have access to the ARS 201 via the receiving unit 205 and forwarding unit 207, for example, as illustrated by arrow 13 in FIG. 1. The ARS 201 may operate as a stand alone database device or may form part of an other node, server or entity in a telecommunications network, for example. Thus, maintaining and updating the information registered in the ARS can be handled by a network operator or owner of the ARS and/or by each party itself, for example. Registration of identities and corresponding network contact addresses in the ARS may be provided on a subscription bases, for example. Suitable procedures for processing identities and corresponding network contact addresses are known to the skilled person.

Figure 7:
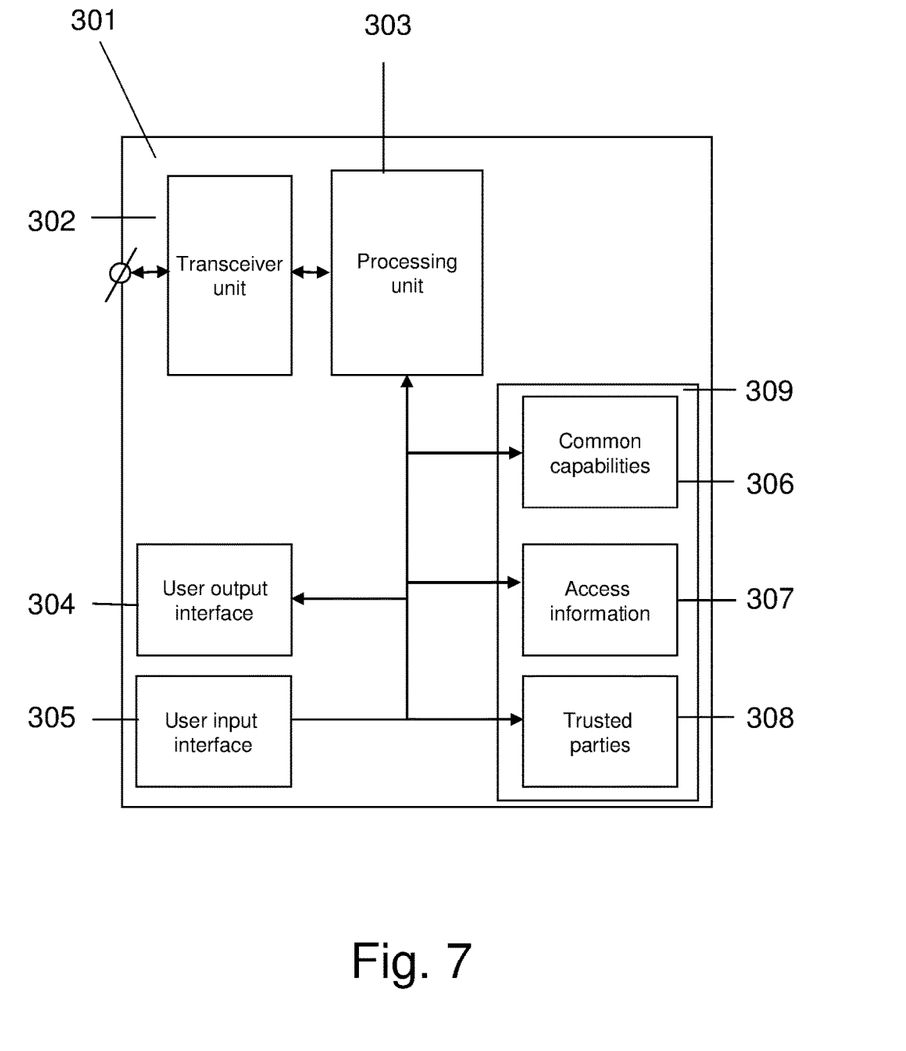
FIG. 7 is a schematic view of an example of a communication device arranged for operating as a called party in a telecommunications network according to the invention.

FIG. 7 is a schematic view of an example of user equipment 301 arranged for operating as a party, for example a called party, in a telecommunications network and is arranged for performing steps of the method according to an example of the invention. The user equipment 301 comprises a user input/output interface 304, 305, a radio transceiver unit 302, a processing unit 303 and a storage unit 309 arranged for storing access information 307, communication capabilities 306 and a list of trusted parties 308, if available, for determining whether and which access information to be provided to a particular party, in accordance with examples of the invention as discussed above.

The user equipment 301, i.e. the processing unit 303 thereof, may be arranged for providing access information 307 based on any of user input by the input/output interface

304, 305, a list of trusted parties 308, and communication capabilities 306 mutually available at a calling party and the party operating the user equipment 301. The information stored in the storage unit may be user specific.

Instead of an on board storage 309, any or all of the access information 307, the communication capabilities 306 and the list of trusted parties 308 may be stored in a storage external of the user equipment 301, however accessible by the user equipment 301 via a fixed or wireless link, for example a WIFI or Bluetooth link, for example.

Implementation of the present invention is regarded beneficial for cases where data that is accessible by the party to be called is stored at e.g. authorities, governments or medical staff. Data that is stored at these parties might e.g. personal data like a physical address, medical data, social security data, insurance data, etc. The party to be called is in control to provide the calling party with the data, by retrieving the data at the authorities at the instant when an entity initializes a link with an appropriate address of the party to be called. Depending on the identity of the calling entity, e.g. an emergency centre, medical data is submitted by the called party to the calling entity.

The skilled person will appreciate that the invention is not limited by the specific embodiments described within this specification and illustrated in the drawings, but may be practised otherwise. The scope of the invention is only determined by the appended claims.

The invention claimed is:

1. A method of requesting access information of a party in a telecommunications network, said party having access information comprising communication capabilities said party is able to handle, and wherein said party is registered with a unique identity and at least one network contact address at a server, said method comprising:
   initiating, by an entity in said network, a contact request to said server for at least one network contact address of said party, said contact request comprising information representing said identity of said party;
   receiving a token, by said entity, from said server, said token comprising said at least one network contact address of said party;
   initiating, by said entity, an access request to said party for retrieving said access information using said at least one network contact address of said party comprised by said token; and
   receiving, by said entity, access information from said party in response to said access request.

2. The method of claim 1, wherein the method further comprises initiating, by said entity, a communication session towards said party being a called party based on said access information received from said party.

3. The method of claim 1, wherein said receiving said access information comprises receiving said access information depending on user input of said party.

4. The method of claim 1, wherein said access information of said party comprises a preference setting for indicating a preferred type of communication session by said party.

5. The method of claim 1, wherein said access request comprises information of communication capabilities of a calling party for setting up a communication session with said party being a called party, and wherein said step of receiving said access information from said party comprises receiving access information of communication capabilities mutually available to said calling and called party.

6. The method of claim 1, wherein said party comprises a list of trusted parties, and wherein said access information received from said party depends on whether a calling party is a trusted party according to said list of trusted parties.

7. The method of claim 6, wherein said access information of said party comprises said list of trusted parties.

8. The method of claim 1, wherein said unique identity is any of an MSISDN of said party, a next available MSIDSN of said party, and a non-MSISDN based identification of said party.

9. An entity for operation in a telecommunications network for requesting access information of a party in a telecommunications network, said party having access information comprising communication capabilities said party is able to handle, and wherein said party is registered with a unique identity and at least one network contact address at a server, said network entity comprising:
   communication circuitry configured to communicate with said party and said server; and
   processing circuitry operatively associated with said communication circuitry and configured to:
      initiate a contact request to said server for at least one network contact address of said party, said contact request comprising information representing said identity of said party;
      receive a token from said server, said token comprising said at least one network contact address of said party;
      initiate an access request to said party for retrieving said access information using said at least one network contact address of said party comprised by said token; and
      receive access information from said party in response to said access request.

10. The entity of claim 9, wherein said entity is any of a calling party and a communication network gateway.

11. A telecommunications network comprising a network entity arranged for requesting access information of a party in said telecommunications network, said party having access information comprising communication capabilities said party is able to handle, and comprising a server in which said party is registered with a unique identity and at least one network contact address, said network entity comprising:
   communication circuitry configured to communicate with said party and said server; and
   processing circuitry operatively associated with said communication circuitry and configured to:
      initiate a contact request to said server for at least one network contact address of said party, said contact request comprising information representing said identity of said party;
      receive a token from said server, said token comprising said at least one network contact address of said party;
      initiate an access request to said party for retrieving said access information using said at least one network contact address of said party comprised by said token; and
      receive access information from said party in response to said access request;
wherein said server comprises:
   a register arranged to store an identity and at least one network contact address of said party;
   communication circuitry configured to communicate with said party and said server; and
   processing circuitry operatively associated with said communication circuitry and configured to:
      receive said contact request from said network entity;

generate said token comprising said at least one network contact address in response to said contact request; and forward said token to said network entity.

12. The telecommunications network of claim 11, wherein said network entity is further arranged to establish a communication session between a calling party and said party being a called party based on said access information received from said party.

13. The telecommunications network of claim 11, wherein said access information comprises a preference setting for indicating a preferred type of communication session for said party.

14. A user equipment arranged to operate as a party in the telecommunications network of claim 11, said user equipment comprising a user input/output interface, a transceiver unit, a processing unit and a storage unit arranged to store access information, wherein said user equipment is arranged to provide access information based on any of user input, a list of trusted parties, and communication capabilities mutually available at a calling party and said party being a called party.

* * * * *